United States Patent Office 3,623,179
Patented Nov. 30, 1971

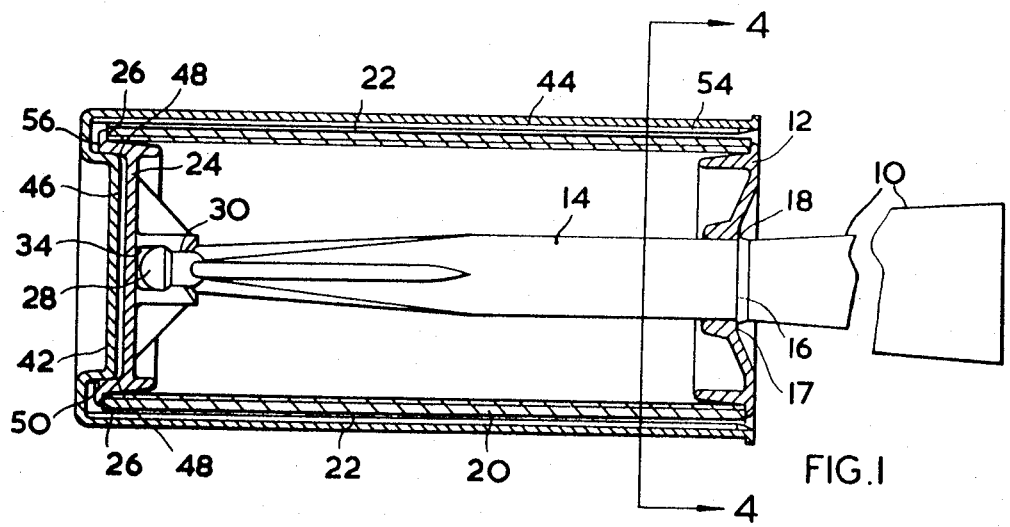
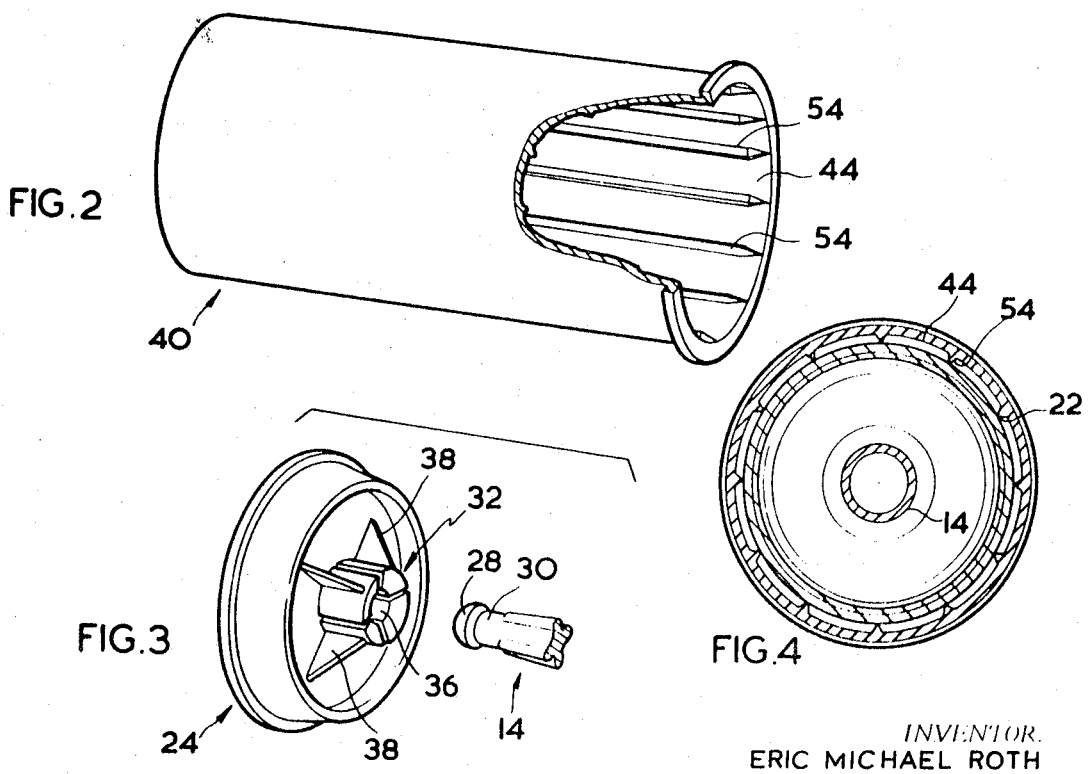

3,623,179
TACKY ROLLER HAVING SPLINED COVER
Eric Michael Roth, R.R. 1, Unionville, Ontario, Canada
Filed Sept. 10, 1969, Ser. No. 856,772
Int. Cl. A47l 25/00
U.S. Cl. 15—104 A
4 Claims

ABSTRACT OF THE DISCLOSURE

A particle collecting roller with a tacky surface is mounted on one end of the handle and the roller has a recessed free end cap which will detachably attach to a cover for the roller. With the cover so attached and overlying the roller, splines on the inner cover surface, space the cover from the tacky surface.

---

This invention relates to a particle removal device using a tacky surfaced particle retaining roller and to a protective cover therefor and to means for assembling the casing to the roller.

It is an object of the invention to provide a lint roller rotatably mounted on one end of a handle, said roller having a substantially cylindrical particle collecting surface wherein a protective casing for covering lint collecting surface is detachably attachable to the roller assembly; and wherein the design of the particle roller is such that the particle collecting surface is the widest projecting part of the device in a direction transverse to the rotation axis.

The above object is achieved by providing a handle axially extending from the roller, of smaller transverse dimensions than the roller, and by providing a novel means of attachment of a cover for covering the tacky surface when not in use, which means of attachment does not require an extension beyond the cylindrical surface of the roller. Preferably the means and method for attaching the outer surface is such as to allow the particle roller to stand on end when the cover is removed.

This arrangement is achieved by providing a hollow cylindrical cover having one closed end with the cylindrical portion dimensioned to overlie the tacky surface with the inner surface of the cylindrical portion slightly spaced therefrom the cover having a detachable friction attachment between the outer end member of the handle-roller assembly and the closed end of the cover; and the handle being provided on the inner side of its cylindrical wall with inwardly projecting splines on the inner wall of the cover which are designed to contact the tacky surface and maintain it spaced from the inwardly facing cylindrical wall of the cover. The splines extend longitudinally in a direction which makes an angle of less than 45° with the axial sliding direction of the cover onto the roller.

The splines act to space the main area of the inner cover surface from the tacky particle collecting surface and to prevent sticking between these members.

In another aspect of the invention, an outer end cap is designed to provide the outer bearing connection between the particle roller and the handle and to retain the particle roller on the handle and is provided with a novel means of attachment to the handle. In accord with the novel method of attachment, the handle is provided with a shank extending through the lint roller and near its end remote from the handle, the shank is provided with a thin stem and an outwardly located enlarged bead. A boss on the end cap is provided with a well defining a deeper wide cavity to receive the bead and a shallower narrower cavity to receive the shank, and the well, so that when the cavities receive their respective handle members, the end cap is freely rotatable on the handle. On the other hand, the shallower part of the cavity is designed to be sufficiently narrow that only by deformation of the defining material can the bead be inserted or removed. The necessary combination of resilience to allow insertion (and removal) of the bead and stiffness to return it, is provided by constructing the boss walls (which are preferably integral with the end cap) of resilient plastic and providing open ended slots through the boss walls, extending from the handle adjacent end of the boss toward the boss roots, dividing the boss walls into sectors. These deformable sectors are stiffened by providing them on the outside of the boss wall with projecting vanes of fairings (again preferably integral with the end cap) extending from the outside of a sector near the handle-proximate extremity outwardly to the surface of the end cap.

In the drawings which illustrate a preferred embodiment of the invention;

FIG. 1 shows a cross-section of a lint roller mounted on a handle;

FIG. 2 shows a detail of the protective casing;

FIG. 3 shows a detail of the junction of the outer end cap to the handle; and

FIG. 4 shows a cross-section along the lines 4—4 of FIG. 1.

In the drawings a handle 10, shown in part only, has projecting therefrom mounting shank 14 designed to rotatably mount thereon inner end cap 12. A flange 16 on the shank co-operates with a shoulder 17 on the inner end cap 12 to limit movement of the inner end cap 12 toward the handle but the end cap 12 may be slid on and off the shank. The inner end cap 12 near its outer edge is provided with means for frictionally coupling to the inner end of a lint roller 20 for rotation together.

The lint roller 20 is a hollow cylinder and may be made of cardboard, plastic or the like and for use is covered on its exterior surface with a tape-like material having on the outside a tacky surface for the retention of lint or other particles. The expanse of the tacky surface is not shown as this and its mode of application is well known to those skilled in the art, and does not form a part of the present invention. The use of an exterior cover to prevent the tacky surface accidentally adhering to exterior surfaces does form part of the present invention as does the means disclosed of maintaining the relevant parts of the cover spaced from the tacky surface when the cover is in use.

An outer end cap 24 is provided with means for frictionally coupling to the outer end of the roller and shoulder 26 for bearing thereon to limit movement of the lint roller 20 away from the handle relative to the outer end cap 24.

The handle 10 is connected (preferably integrally) to shank 14 and to have shank 14 extending downwardly axially through and along most of the length of the lint roller.

The handle shank adjacent its outer end ("inner" and "outer" herein are intended to mean toward and away from the handle) is provided with an outer enlarged bead 28 on an inner thinner stem 30. The outer end cap 24 is provided with an inwardly projecting boss 32 surrounding a well having an (dimensions measured transverse to the roller axis) enlarged deeper cavity 34 and a narrower shallow cavity 36. (See FIG. 1 and FIG. 3.) The inner end of boss 32 is defined by surfaces sloping inwardly to guide a relatively approaching bead 28 toward well 36. These cavities are dimensioned so that when the bead 28 is received in the deep cavity 34 and the stem 30 in the shallower cavity the outer end cap 24 is rotatable on the shank 14. However, the dimensioning is such that boss walls defining the narrow cavity 36 must be deformed to allow the bead 28 to pass therethrough in either direction. The boss walls made of resilient material (preferably plastic and integral with end cap 24) are therefore slotted as indicated in FIG. 3 (with slots through the boss walls extending from the inner end and dividing the inner end of the boss wall into sectors), to allow the boss walls to be deformed outwardly during inward pressure of the bead 28 which is preferably tapered inward toward its free end to achieve wedging outward pressure on the walls. The resistance of the boss walls to deformation is increased however by providing resilient supporting vanes 38 extending outwardly from the inner end of the outside of the boss wall to the inner end cap surface. Thus the outer end cap is removably but fixedly held in place by the boss wall shape which retains bead 28 in well 34 and the strength of retention is increased by the provision of the vanes 38 which are deformed slightly with deformation of the boss wall.

The lint removal device is assembled by placing the inner end cap 12 on the shank 14 resting against the flange 16 and frictionally attaching the lint roller 20 to inner end cap 12. The outer end cap 24 is then frictionally attached to the outer end of the lint roller and the boss snapped over the bead 28 so that bead 28 is received in the cavity 34.

The cover 40 to protect the lint roller when not in use (shown in perspective in FIG. 2 and in cross-section in FIG. 1) is of generally cylindrical shape having one closed end wall 42, intended to be the outer end and having the inner surface 44 of its cylindrical wall dimensioned to overlie but be spaced from the tacky outer surface of roller 20.

The outer end cap 24 is provided with an outwardly facing depression 46 having side walls 48 of nearly cylindrical shape but preferably tapering slightly inwardly (say about 2% to the axis of revolution of the lint roller) toward the bottom of the depression.

The end walls 42 of the cover 40 is provided with an inwardly projecting boss 50 having side walls designed to seat boss 50 in the depression 46 with the boss side walls in frictional contact with the side walls 48 to retain the seating. This frictional seating retains the cover attached to and covering the roller. To maintain the inner cover cylindrical surface 44 spaced from the tacky surface of roller 20 the inner casing wall is provided with inwardly directed splines 54 to contact the tacky surface of roller 20. These splines 54 preferably extend parallel to the axis of revolution (parallel to the sliding direction of the cover over the tacky surface) but in any event within 45° of this direction to permit easy sliding of the cover over the tacky surface.

The handle 10 is preferably of smaller radial extension relative to the axis of revolution of the roller than the tacky surface It will be noted that the attachment of the cover to the device, solely through the attachment of the end wall of the cover member to the outer end cap of the roller-handle assembly, ensures that no members need, on the roller, project radially outwardly from the roller axis of revolution beyond the tacky surface. This greatly increases the ease of use and functionality of the roller. It is noted that the inwardly directed cover splines combine with the end attachment to produce a desirable device since they maintain the spaced tacky surface and the cover wall in areas spaced from the attachment location.

The outer end cap 24 is preferably shaped to provide an outwardly facing, gravitationally stable surface so that the particle roller may be stood on its outer end when not in use and with the cover removed. Such gravitationally stable shaping is achieved in the present embodiment by the flat outwardly facing surface 56 on end cap 24. The gravitational stability of course, requires the projecting handle to be dimensioned and project in a direction to place the centre of gravity of the device over the support locus of cap 24.

As it will be hoped is obvious, the main function of a device of this type is to roll over surfaces on which particles collect, and the particles adhering to the tacky surface are removed from the surfaces on which they collect.

I claim:

1. A particle removal device for removing particles from surfaces including an assembly comprising a handle, and a roller having an outer surface in the shape of a surface of revolution rotatably mounted on said handle so that said handle projects from one end thereof, and so that said roller rotates on said handle about the axis of said surface of revolution, tacky material provided on the outer surface of said roller, said roller being shaped so that a cover may be slid axially thereover from the end remote from said handle to overlie said roller; a cover and means on the end of said cover, for detachably frictionally attaching said cover to said assembly with a wall of said cover overlying said tacky surface and dimensioned to be spaced therefrom and wherein there are provided inwardly directed splines on the inner surface of the cover overlying said tacky surface, said inwardly directed splines bing designed to contact said tacky surface to space the overlying surface therefrom; the longitudinal direction of said splines being arranged to make an angle of less than 45° with the sliding direction of said overlying surface axially over said tacky surface, wherein an end cap is designed to attach to said handle-roller assembly at the end remote from the handle projection from said assembly; and said end cap is provided with a depression on its outwardly facing side; and end wall of said cover is provided with an inwardly projecting boss, and wherein there are provided complementary side walls on said depression and on said boss designed to make a friction fit with each other to detachably retain said cover attached to said assembly with said cover wall overlying said tacky surface.

2. A particle removal device for removing particles from surfaces including an assembly comprising a handle, and a roller having an outer surface in the shape of a surface of revolution rotatably mounted on said handle so that said handle projects from one end thereof, and so that said roller rotates on said handle about the axis of said surface of revolution, tacky material provided on the outer surface of said roller, said roller being shaped so that a cover may be slid axially thereover from the end remote from said handle to overlie said roller; a cover and means on the end of said cover, for detachably frictionally attaching said cover to said assembly with a wall of said cover overlying said tacky surface and dimensioned to be spaced therefrom and wherein there are provided inwardly directed splines on the inner surface of the cover overlying said tacky surface, said inwardly directed splines being designed to contact said tacky surface to space the overlying surface therefrom; the longitudinal direction of said splines being arranged to make an angle of less than 45° with the sliding direction of said overlying surface axially over said tacky surface wherein said roller and said overlying cover surface are cylindrical, wherein an end cap is designed to attach to said handle roller assembly at the ed remote from the handle projection from said assembly; and said end cap is provided with a depression on its outwardly facing side; and end wall of said cover is provided with an inwardly projecting boss, and wherein there are provided complementary side walls on said depression and on said boss designed to make a friction fit with each other to detachably retain said cover attached to said assembly with said cover cylindrical surface overlying said tacky surface.

3. A particle removal device for removing particles including an assembly comprising a handle, a roller having an outer surface defining a surface of revolution rotatably mounted on the handle to rotate upon an axis approximately coincident with the axis of the surface of revolution, the handle being located to project from one end of said roller, said surface being embodied by outwardly facing tacky material, said roller being shaped so that a cover may be slid thereover from the end of said roller remote from said handle, a cover shaped to be so slid thereover to overlie said tacky surface and dimensioned to be spaced therefrom and wherein there are provided inwardly directed splines on the inner surface of the cover overlying said tacky surface, said inwardly directed splines being designed to contact said tacky surface to space the overlying surface therefrom; the longitudinal direction of said splines being arranged to make an angle of less than 45° with the sliding direction of said overlying surface axially over said tacky surface, means for removably mounting said cover on said roller at the end of said roller remote from said handle projection, said roller being designed and constructed so that said tacky surface forms the outermost part of the roller measured outwardly from the axis of rotation, wherein the radially outermost portion of the handle from the axis of rotation, is inwardly of said tacky surface, wherein an end cap with an end wall is provided on said handle roller assembly, at the end remote from the direction of handle projection, said cover is provided with an end wall desgined to be juxtaposed with said end wall when the cover overlies said tacky surface, said cover end wall being designed to removably attach to said end cap.

4. A particle removal device for removing particles including an assembly comprising a handle, a roller having an outer surface defining a surface of revolution rotatably mounted on the handle to rotate upon an axis approximately coincident with the axis of the surface of revolution, the handle being located to project from one end of said roller, said surface being embodied by outwardly facing tacky material, said roller being shaped so that a cover may be slid thereover from the end of said roller remote from said handle, a cover shaped to be so slid thereover to overlie said tacky surface, and dimensioned to be spaced therefrom and wherein there are provided inwardly directed splines on the inner surface of the cover overlying said tacky surface, said inwardly directed splines being designed to contact said tacky surface to space the overlying surface therefrom; the longitudinal direction of said splines being arranged to make an angle of less than 45° with the sliding direction of said overlying surface axially over said tacky surface, means for removably mounting said cover on said roller at the end of said roller remote from said handle projection, said roller being designed and constructed so that said tacky surface forms the outermost part of the roller measured outwardly from the axis of rotation, wherein the radially outermost portion of the handle from the axis of rotation is inwardly of said tacky surface, wherein said surface of revolution is a cylinder, wherein an end cap with an end wall is provided on said handle roller assembly, at the end remote from the direction of handle projection, said cover is provided with an end wall designed to be juxtaposed with said end wall when the cover overlies said tacky surface, said cover end wall being designed to removably attach to said end cap.

References Cited

UNITED STATES PATENTS

| | | | |
|---|---|---|---|
| 1,864,877 | 6/1932 | White | 206—52 |
| 2,134,128 | 10/1938 | Hopkins | 206—52 |
| 2,611,064 | 9/1952 | Wilson | 220—72 UX |
| 2,694,534 | 11/1954 | Stingle et al. | 220—72 UX |
| 2,694,874 | 11/1954 | Coolidge et al. | 29—116 R X |
| 2,891,301 | 6/1959 | Conklin | 29—116 |
| 2,977,671 | 4/1961 | Wiegand | 29—116 |
| 2,982,010 | 5/1961 | Johns | 29—116 |
| 3,421,170 | 1/1969 | Thomas | 15—104 A |
| 2,401,842 | 6/1946 | Slater | 15—104 A |

FOREIGN PATENTS

| | | | |
|---|---|---|---|
| 158,600 | 9/1954 | Australia | 15—104 A |
| 1,075,026 | 2/1960 | Germany | 29—116 R |
| 486,933 | 6/1938 | Great Britain | 206—52 |

DANIEL BLUM, Primary Examiner

U.S. Cl. X.R.

15—230.11; 206—52 R